US012728829B2

(12) United States Patent
Thode et al.

(10) Patent No.: US 12,728,829 B2
(45) Date of Patent: Sep. 8, 2026

(54) PNEUMATIC CONTROLLER FOR A HYDRODYNAMIC BRAKE

(71) Applicant: ETO MAGNETIC GmbH, Stockach (DE)

(72) Inventors: Oliver Thode, Stockach (DE); Jörg Bürssner, Engen (DE); Anthony Laval, Radolfzell (DE); Peter Sohnemann, Radolfzell (DE)

(73) Assignee: ETO MAGNETIC GmbH, Stockach (DE)

( * ) Notice: Subject to any disclaimer, the term of this patent is extended or adjusted under 35 U.S.C. 154(b) by 343 days.

(21) Appl. No.: 18/694,734

(22) PCT Filed: Sep. 5, 2022

(86) PCT No.: PCT/EP2022/074627
§ 371 (c)(1),
(2) Date: Mar. 22, 2024

(87) PCT Pub. No.: WO2023/046451
PCT Pub. Date: Mar. 30, 2023

(65) Prior Publication Data

US 2024/0400020 A1 Dec. 5, 2024

(30) Foreign Application Priority Data

Sep. 24, 2021 (DE) ..................... 10 2021 124 745.4
Feb. 23, 2022 (DE) ..................... 10 2022 104 290.1

(51) Int. Cl.

| | |
|---|---|
| ***B60T 10/02*** | (2006.01) |
| ***B60T 1/087*** | (2006.01) |
| ***B60T 8/36*** | (2006.01) |
| ***B60T 13/26*** | (2006.01) |
| ***B60T 13/68*** | (2006.01) |

(52) U.S. Cl.
CPC .............. *B60T 10/02* (2013.01); *B60T 1/087* (2013.01); *B60T 8/362* (2013.01); *B60T 13/266* (2013.01); *B60T 13/683* (2013.01)

(58) Field of Classification Search
CPC ...... B60T 13/581; B60T 13/26; B60T 13/266; B60T 13/36; B60T 13/66; B60T 13/68;
(Continued)

(56) References Cited

U.S. PATENT DOCUMENTS 5,333,707 A 8/1994 Kaneda
11,155,253 B2 * 10/2021 Schmidt ................ B60T 13/662

FOREIGN PATENT DOCUMENTS

DE 19918070 A1 * 12/1999 .............. B60T 8/327
DE 19929152 A1 1/2001
(Continued)

OTHER PUBLICATIONS

German Search Report dated Dec. 6, 2022 issued for corresponding German Patent Application No. 102022104290.1 (and English translation).

(Continued)

*Primary Examiner* — Devon C Kramer
(74) *Attorney, Agent, or Firm* — Posz Law Group, PLC

(57) ABSTRACT

A pneumatic controlling device for a hydrodynamic brake comprises a working-pressure port, and further comprises at least one inlet valve via which a working-pressure line leading to the working-pressure port can be connected to an air feed line that is connected to a compressed-air source, and comprises at least one outlet valve via which the working-pressure line is connected to an air bleed line that is connected to an air bleed exit, wherein the working-pressure line is connected to the air bleed line via at least one quick air bleed valve, wherein a safety valve is arranged
(Continued)

between the compressed-air source and the quick air bleed valve and is configured to actuate the quick air bleed valve.

11 Claims, 5 Drawing Sheets

(58) Field of Classification Search
CPC ...... B60T 13/683; B60T 13/662; B60T 1/087; B60T 10/02; B60T 8/327; B60T 8/3655; B60T 8/36; B60T 8/3615; B60T 8/362; F16F 2222/126
See application file for complete search history.

(56) References Cited

FOREIGN PATENT DOCUMENTS

| | | | | |
|---|---|---|---|---|
| DE | 102005050480 | B3 | 1/2007 | |
| DE | 102011106522 | B3 | 10/2012 | |
| DE | 102017009225 | A1 | 5/2018 | |
| DE | 102017009954 | A1 * | 5/2019 | .............. B60T 8/361 |
| DE | 102019134843 | A1 * | 6/2021 | ............ B60T 13/662 |
| DE | 102022101142 | A1 * | 7/2023 | ............ B60T 13/385 |
| EP | 1970789 | A2 | 9/2008 | |
| EP | 3819175 | A1 * | 5/2021 | ............. F16D 65/14 |
| WO | WO-2008113591 | A2 * | 9/2008 | ................ B60T 7/20 |

OTHER PUBLICATIONS

International Search Report mailed Jan. 5, 2023 for corresponding International Application No. PCT/EP2022/074627.
International Preliminary Report on Patentability mailed Mar. 26, 2024 and Written Opinion of the International Searching Authority mailed Jan. 5, 2023 in the corresponding International Application No. PCT/EP2022/074627.

* cited by examiner

PNEUMATIC CONTROLLER FOR A HYDRODYNAMIC BRAKE

CROSS REFERENCE TO RELATED APPLICATION

This application is a U.S. national stage application of PCT/EP2022/074627 filed on Sep. 5, 2022 which is based on and claims the benefit of priority of the prior German Patent Application No. 10 2021 124 745.4 filed on Sep. 24, 2021 and German Patent Application No. 10 2022 104 290.1 filed on Feb. 23, 2022, the entire contents of which are incorporated herein by reference.

The present invention relates to a pneumatic controlling device for a hydrodynamic brake. The present invention furthermore relates to a hydrodynamic brake with such a pneumatic controlling device.

Generic pneumatic controlling devices are often used in so-called retarders which can be configured as hydrodynamic or electromagnetic retarders. Such retarders can be used, for example, in buses and trucks above a certain gross weight as an endurance braking system in order to ensure at all times safe braking or the provision of braking power whilst driving with such a vehicle. Such retarders are here used alongside a service braking system in order to enable largely wear-free deceleration of the vehicle over a relatively long period of time by means of the retarder, for example even when driving downhill.

Hydrodynamic retarders are controlled to fix the level of a braking torque to be generated, usually by means of a pneumatic control system. Such controllers are known from the prior art. By means of such control systems, braking power is, depending on the braking requirement of a vehicle, controlled or regulated by compressed air being applied to a storage tank filled with a working fluid of the retarder.

In order to make the appropriate braking torque available as quickly as possible when the retarder is switched on and/or off and when there is a change in the braking torque requested by the driver, air needs to be admitted and bled quickly from the pneumatic control circuit of the retarder, in particular a storage tank which is filled with the working fluid. It is particularly important to quickly air-bleed the storage tank in order in this way to switch off the braking torque of the retarder as quickly as possible depending on the situation. In order to admit air and bleed it quickly, known pneumatic control systems have, for example, one or more inlet valves and one or more outlet valves which each comprise an opening cross-section which is as large as possible and short switching times.

For example, a pneumatic control system is described in the document EP 3 819 175A1, in which a plurality of inlet valves and a plurality of outlet valves can be operated in a respective parallel connection. The respective valves can also be pilot-controlled. By means of a parallel connection, the effective opening cross-section of the inlet valves, as well as of the outlet valves, can in each case be increased such that air can be admitted and bled more quickly. However, this control system also has disadvantages in terms of operational safety.

A controlling device which comprises a pilot-control stage with an inlet valve and an outlet valve and a main control stage with two inlet valves and an outlet valve is, for example, described in the document EP 1 970 789 A2 as an approach to resolving the problem. A fixed throttle point which enables at least passively regulation by the pilot-control stage of a pressure for admitting air and bleeding it is created by a physical constriction in a control duct. The regulation provided enables a kind of quick relief function via the relief valve of the main control stage such that the bleed time is shortened. However, the activation of the valve, which provides the quick relief function, is effected via the pilot-control stage. The pilot-control stage is configured with 2/2-way valves which are subject to a certain likelihood of failure. Thus, in the event of failure of the pilot-control stage, there may be no quick relief function available, as a result of which secure functioning of the regulation is not fully ensured.

Against the background of the abovementioned prior art, the object of the present invention is therefore to further develop at least the bleeding of a pneumatic regulating device in such a way that it has (fail) safe functioning and/or can be controlled as finely as possible and/or enables as short as possible a bleed time.

In order to achieve this object, a pneumatic controlling device according to the invention for a hydrodynamic brake is proposed. The pneumatic controlling device comprises a working-pressure port, at least one inlet valve via which a working-pressure line leading to the working-pressure port can be connected to an air feed line connected to a compressed-air source, and at least one outlet valve via which the working-pressure line is connected to an air bleed line connected to an air bleed exit. The working-pressure line is connected to the air bleed line via at least one quick air bleed valve. The pneumatic controlling device according to the invention is characterized in that a safety valve is arranged between the compressed-air source and the quick air bleed valve and is configured to actuate the quick air bleed valve.

Moreover, a hydrodynamic brake with a pneumatic controlling device according to the invention is proposed in order to achieve the abovementioned object.

Particularly quick switching-off of a hydrodynamic brake connected to the working-pressure port, such as for example a retarder, is, for example, enabled by the controller according to the invention. Namely, rapid bleeding of a working pressure which exists inside the working-pressure line(s), and therefore also of the working-pressure port, is enabled by means of the at least one quick air bleed valve. The working-pressure line is connected to the air bleed line leading to the air bleed exit, preferably directly, via the quick air bleed valve. In principle, the controller can also have a plurality of quick air bleed valves which can, for example, be connected in parallel to one another and can each be actuated via a safety valve or alternatively via a common safety valve.

The safety valve is preferably arranged between the compressed-air source and the quick air bleed valve in such a way that pneumatic pilot control of the quick air bleed valve by means of the safety valve is enabled. The safety valve is preferably configured so that it can be actuated, for example, in the manner of a solenoid switch valve or in a different fashion. The safety valve can preferably be switched at least between an active position and an inactive position and thus configured to pilot-control the quick air bleed valve. In other words, according to a preferred embodiment, the quick air bleed valve is pneumatically pilot-controlled by means of the safety valve. The safety valve can moreover preferably be switchable into at least one intermediate position.

In the inactive position of the safety valve, at least one output of the safety valve is preferably connected (in particular directly) to the air bleed line such that the safety valve is configured to bleed as completely as possible a pilot-control duct which leads to the quick air bleed valve. In this inactive position, the pilot-control duct opens into an input of the safety valve. In the inactive position of the safety valve, a control input at the quick air bleed valve which is pneumatically (pilot-) controllable by the safety valve is preferably completely unpressurized such that the quick air bleed valve is situated in as complete as possible a throughflow position in which the working-pressure line is connected to the air bleed line via the quick air bleed valve. In the inactive position of the safety valve, the quick air bleed valve is preferably also situated in an inactive, i.e. unpressurized position. Complete quick bleeding of the working-pressure port is possible in the inactive position of the quick air bleed valve.

In the active position of the safety valve, a flow path between an input, on the pressure source side, of the safety valve and an output, on the pilot-control duct side, of the safety valve is preferably freed up. The safety valve is thus configured to build up, by means of the pressure source, a pilot-control pressure in the pilot-control duct and thus also at the control input of the quick air bleed valve. The quick air bleed valve is switched into an active position by the pilot-control pressure. In the active position of the quick air bleed valve, bleeding of the working-pressure line is prevented. The quick air bleed valve is thus situated in a blocking position in which at least one valve input and one valve output are blocked. In the active position of the quick air bleed valve, it is therefore possible to build up pressure in the working-pressure line and thus at the working-pressure port.

In a preferred embodiment, the safety valve is configured as a 3/2-way valve, in particular as a 3/2-way solenoid switch valve. This design of the safety valve is particularly preferred for pilot-controlling the quick air bleed valve. In principle, however, further valve designs not mentioned here are also conceivable. The pilot control according to the invention of the quick air bleed valve has safety-related advantages in particular compared with pilot control of quick bleeding by means of a pilot-control stage which has 2/2-way valves, as is disclosed in EP 1 970 789 A2. In particular, the likelihood of failure of the quick bleed function is reduced because complete relief of pressure is ensured in the inactive position of the safety valve. The pilot control is also less complex and requires less structural space compared with a pilot-control stage.

In a further preferred embodiment, a controllable throttle or alternatively a mechanically pilot-controlled valve is arranged between the at least one inlet valve, in particular on the output side of the inlet valve in the working-pressure line, and the working-pressure port. In an alternative preferred embodiment, the controllable throttle or the mechanically pilot-controlled valve is arranged between the pressure source and the at least one inlet valve, in particular in a pressure feed line. According to these two embodiments, the controllable throttle or the mechanically pilot-controlled switch valve can thus be arranged either in the output line, in particular the working-pressure line, or in the input line, in particular the pressure feed line. If the controllable throttle or the mechanically pilot-controlled valve is arranged in the input line, it is preferably situated upstream from the at least one input valve.

The mechanically pilot-controlled (switch) valve is preferably configured as a poppet valve, in particular as a 2/2-way valve, and can be switched back and forth between a preferably completely open and a preferably completely closed position. In the closed position, a valve body with a valve-specific design preferably sits on the valve seat and particularly preferably establishes a complete seal. Although such a configuration with a mechanically pilot-controlled valve is technically more complex, it can be advantageous because complete closure of the valve seat is enabled in the case of such valves such that residual leakage, as occurs in the case of the modifiable and/or controllable throttle, can be avoided. The complete closure has, for example, the advantage that, for example, a compressor of a vehicle, which supplies compressed air, does not have to run permanently and instead can be switched off by the closure of the valve.

The controllable throttle can preferably be adjusted between a completely open position and a completely closed position, in particularly steplessly. In the open position, the controllable throttle preferably has an opening cross-section such that unobstructed passage through the throttle is enabled. The throttle cross-section is here preferably the same size as a cross-section of the working-pressure line such that no constriction is formed by the throttle in the open position. In the closed position, the controllable throttle is preferably completely closed such that a passage through the throttle is not possible. The likelihood of failure of the controller is reduced by the provision of such a controllable throttle. For this purpose, in other words, a throttle with a modifiable opening cross-section, i.e. not a throttle with a fixed throttle cross-section, is provided between the working-pressure line and the working-pressure port. The modifiable, i.e. regulatable, throttle has the advantage of blocking the working-pressure line between the at least one input valve and the working-pressure port during a quick bleed procedure in which the quick air bleed valve is situated in the throughflow position. If the at least one inlet valve remains in the case of a fault, for example, in an active, i.e. at least partially open switched position, it can be prevented via the throttle which is then closed that the compressed-air source remains connected to the working-pressure port via the at least one inlet valve. It can thus, for example, be prevented that an undesired braking torque is supplied at a brake system which is connected to the working-pressure port. It is particularly advantageous that, by virtue of the controllable throttle, no additional actuators or additional pilot-control valves are needed such that the preferred solution of the invention can be configured particularly simply and cost-effectively. Moreover, the modifiable controllable throttle is robust during operation such that the overall functional safety at the device level can be increased.

A throttle which can be varied in this way with a preferably modifiable opening cross-section can, for example, be designed in such a way that a transverse or longitudinal bore is provided, for example, in a throttle body. A displaceably mounted piston element can advantageously be arranged in the transverse or longitudinal bore. Pushing the piston element into the transverse or longitudinal bore can advantageously achieve a throttle effect, in particular can increase the throttle effect. In contrast, the throttle effect is preferably reduced by outward movement of the piston element. Such a configuration of the throttle with a modifiable opening cross-section has the advantage that structurally simple and cost-effective production is possible. This advantage even outweighs the side-effect that, because of a structurally limited amount of play required for functioning between the bore wall and the piston element, an albeit only marginal annular gap remains open at all times, through which minimal leakage takes place which can, however, be tolerated in this structural design of the throttle. In particular, this leakage can be compensated preferably via the other discharge and/or draining options, in particular via at least one output valve and at least one quick air bleed valve. For example, in the case of an almost completely closed throttle, it additionally occurs that there is no control pressure present at the output.

It is particularly preferred if the controllable throttle is mechanically connected to the quick air bleed valve. Such a mechanical connection can be established, for example, by means of a spring and/or a lever linkage in order to transmit, for example, an opening and/or closing movement of the controllable throttle to the quick air bleed valve. A tension rod can particularly preferably be used as the mechanical connection between the throttle and the quick air bleed valve. Alternatively, a push rod can also be used as the mechanical connection. Furthermore, coupled rotation or the like can alternatively also be used as the mechanical connection. The coupled rotation can preferably be magnetically coupled rotation. Purely rotational and linear movement and/or simultaneous rotational/linear movement can preferably be implemented with a magnetically coupled rotational connection. The shifting forces and torques which can thus be transmitted are here defined by a number of magnets and their arrangement relative to one another.

In a further preferred embodiment, the quick air bleed valve has a nominal width in a range from 5 to 15 mm, more preferably a nominal width in a range from 7 to 15 mm, particularly preferably in the range from 7 to 9 mm. The term “nominal width” is understood, for example, also to be an opening cross-section of the quick air bleed valve. In a further preferred embodiment, the quick air bleed valve has a nominal width which corresponds to at least twice the nominal width of the at least one inlet valve.

In a further preferred embodiment, the pneumatic controlling device comprises at least two inlet valves which are connected in parallel to one another. It is moreover preferred if the pneumatic controlling device comprises at least two outlet valves which are connected in parallel to one another. Particularly fine pressure regulation of the working pressure at the working-pressure port is ensured as a result. Moreover, the valves in such a parallel connection can be configured with a smaller nominal width compared with a simple non-parallel connection such that smaller valves can be used. As a result, less structural space is required and the regulating device can be configured as more compact overall. Finer pressure regulation is also possible because of a smaller nominal width of the respective valves. Parallel connection of inlet valves and/or outlet valves also has the advantage that a redundancy in the structure of the controller is consequently created, which reduces the likelihood of failure. If, for example, an inlet valve fails, its function can be compensated at least partially via a functional inlet valve connected in parallel. Functioning of a brake system connected to the working-pressure port can, for example, thus continue to be enabled.

In a further preferred embodiment of the hydrodynamic brake, it comprises a retarder. Such a retarder is preferably comprised in an endurance braking system of a motor vehicle such as, for example, a bus or a truck. Such a retarder can be configured in principle as a hydrodynamic or electromagnetic retarder. In the present case, the retarder is particularly preferably configured as a hydrodynamic one. A hydrodynamic retarder is preferably a flow brake which particularly preferably acts as a secondary retarder on a propshaft of a drive train and is arranged either on a manual transmission via an output shaft there or on a final drive via an input shaft there.

Such a retarder preferably comprises a, for example, toroidal housing. A rotatably mounted rotor blade wheel fastened on the output shaft of the manual transmission, the propshaft, or the input shaft of the final drive, and a stationary stator blade wheel fastened on the housing of the retarder are preferably arranged in the housing of the retarder. If the housing of the retarder is then filled at least partially with a working fluid such as hydraulic oil whilst the vehicle is driving, the working fluid is conveyed outward by the rotating rotor blade wheel and flows into the stator blade wheel. In the stator blade wheel, the working fluid is redirected and conveyed back into the interior of the housing. Kinetic energy is converted into thermal energy during this fluid movement. As a result, the vehicle is decelerated by this energy conversion.

By means of the pneumatic controlling device according to the invention, braking power is, depending on the braking requirement of a vehicle, controlled or regulated by compressed air being applied to a storage tank filled with the working fluid of the retarder. If the air pressure fed into the storage tank via the working-pressure port is increased, a quantity of working fluid which is pushed into the housing of the retarder is increased. The braking torque generated in the retarder is also increased as a result. If, in contrast, the air pressure active in the storage tank is decreased via the working-pressure port, working fluid is pushed back into the storage tank from the housing of the retarder because of the elevated pressure now prevailing there. The braking torque generated in the retarder can be actively lowered as a result.

It is assumed that the definitions and explanations of the abovementioned terms apply to all aspects described in this description and below unless specified otherwise. Further details, features, and advantages of the invention can be found in the following description of the preferred exemplary embodiments. The respective features can here be implemented on their own or jointly in combination with one another. The invention is not limited to the exemplary embodiments. The exemplary embodiments are illustrated schematically in the figures. The same reference signs in the individual figures designate the same elements, those with the same function, or those which correspond to one another in terms of their function.

BRIEF DESCRIPTION OF DRAWINGS

Details and embodiments of the invention will be explained below on the basis of purely schematic drawings, in which:

FIG. 1 shows a pneumatic controlling device 10 for a hydrodynamic brake (not illustrated in detail) according to an exemplary embodiment of the invention.

Figure 1:
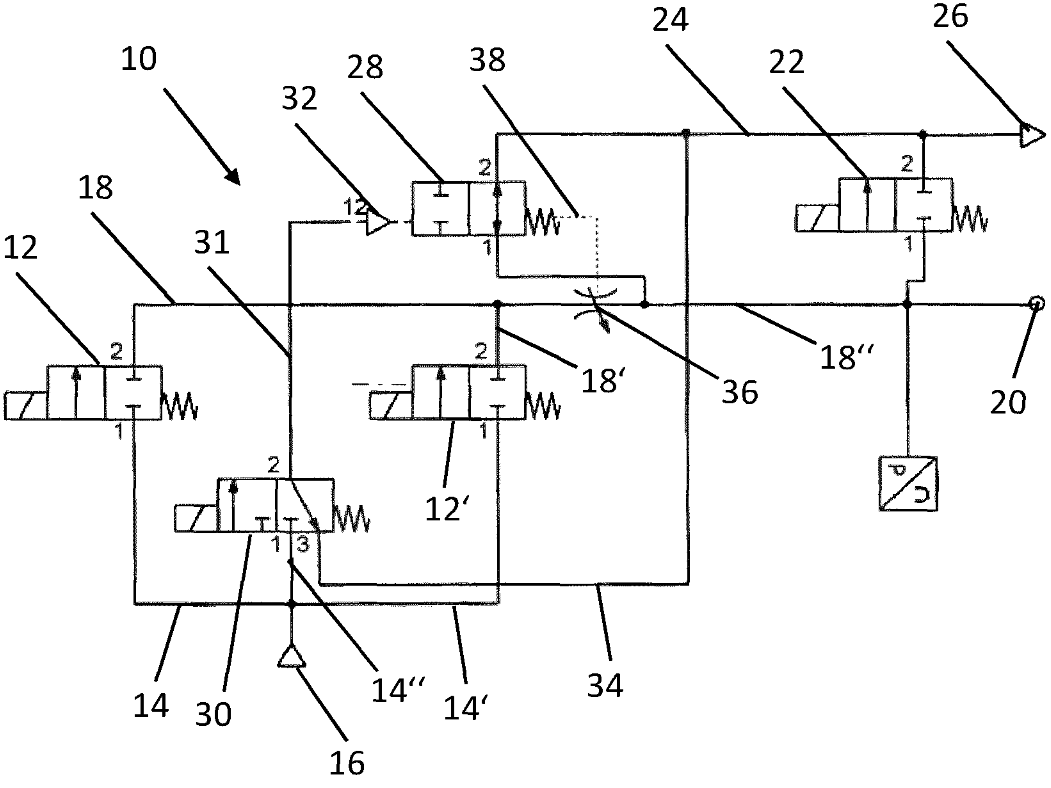
FIG. 1 shows a pneumatic circuit diagram of a controller according to a first preferred embodiment.

The pneumatic controlling device 10 comprises according to FIG. 1 two inlet valves 12, 12' (i.e. therefore at least one inlet valve 12, 12') which are connected in parallel to one another. The inlet valves 12, 12' are configured in the present case as directly controlled 2/2-way solenoid valves. In principle, the inlet valves 12, 12' can also be configured as pneumatically pilot-controlled 2/2-way valves. The inlet valves 12, 12' are closed when no voltage is applied such that no flow through the respective valve is enabled. The inlet valves 12, 12' are open when voltage is applied such that flow of a working fluid through the respective valve is enabled. The inlet valves 12, 12' are each shown in a closed position in FIG. 1.

The two inlet valves 12, 12' each have two valve inputs and two valve outputs. In each case one of the valve inputs and in each case one of the valve outputs is sealed and thus constitutes a flow barrier. In the state in which voltage is applied in each case to the inlet valves 12, in each case one non-blocked valve input is connected to a compressed-air source 16 via an air feed line 14, 14'.

In this open valve position, an in each case non-blocked valve output is moreover connected to a respective working-pressure line 18, 18'. The working-pressure lines 18, 18' have a common node point at which the two working-pressure lines 18, 18' connect to form a single working-pressure line 18". The working-pressure line 18" leads to a working-pressure port 20. A hydrodynamic brake, for example a retarder, can be connected at the working-pressure port 20. An input pressure of the hydrodynamic brake can be regulated by means of the controller 10 via the working-pressure port 20.

The controller 10 moreover has, in the case of FIG. 1, at least one outlet valve 22. In a further exemplary embodiment according to FIG. 2, the controller 10 can also have two or more outlet valves 22, 22' which are connected in parallel to one another. The outlet valves 22, 22' are configured in the present case as directly controlled 2/2-way solenoid valves. In principle, the outlet valves 22, 22' can also be configured as pneumatically pilot-controlled 2/2-way valves. The outlet valves 22, 22' are closed when no voltage is applied such that no flow through the respective valve is enabled. The outlet valves 22, 22' are open when voltage is applied such that flow of a working fluid through the respective valve is enabled. The at least one outlet valve 22, 22' is shown in a closed position in FIG. 1. It is possible to fluidically connect the working-pressure line 18" to an air bleed line 24 via the at least one outlet valve 22, 22'. The air bleed line 24 leads to an air bleed exit 26. Complete bleeding of the controller 10 is enabled via the air bleed exit 26 in order to move, for example, the working-pressure port 20 into an unpressurized state.

The controller 10 has at least one quick air bleed valve 28 for the purpose of bleeding the working-pressure lines 18, 18', 18" and the working-pressure port 20 as quickly as possible. The working-pressure line 18" is connected in the present case to the air bleed line 24 via the quick air bleed valve 28. A safety valve 30 is arranged according to the invention between the compressed-air source 16 and the quick air bleed valve 28. The safety valve is connected to the pressure source 16 on the input side via an air feed line 14". On the output side, the safety valve 30 is connected to a pilot-control valve inlet 32 of the quick air bleed valve 28 via a pilot-control pressure line 31. The safety valve 30 is configured as a 3/2-way solenoid valve in the present case. The quick air bleed valve 28 is pneumatically pilot-controlled by means of the safety valve 30. For this purpose, a pilot-control pressure can, for example, be built up at the pilot-control valve inlet 32 of the quick air bleed valve 28 by closing the safety valve 30 (the safety valve 30 is shown in an open position in FIG. 1), by means of which the quick air bleed valve 28 is moved from an open, i.e. bleeding state (see FIG. 1) into a closed state. In the open state shown, the safety valve 30 is connected to the bleed duct 24 at a valve output via a safety air bleed duct 34 such that no pressure can build up in the pilot-control pressure line 31 in the open state of the safety valve 30. An undesired build-up of pressure in the pilot-control pressure line 31 can be prevented as a result.

Figure 3:
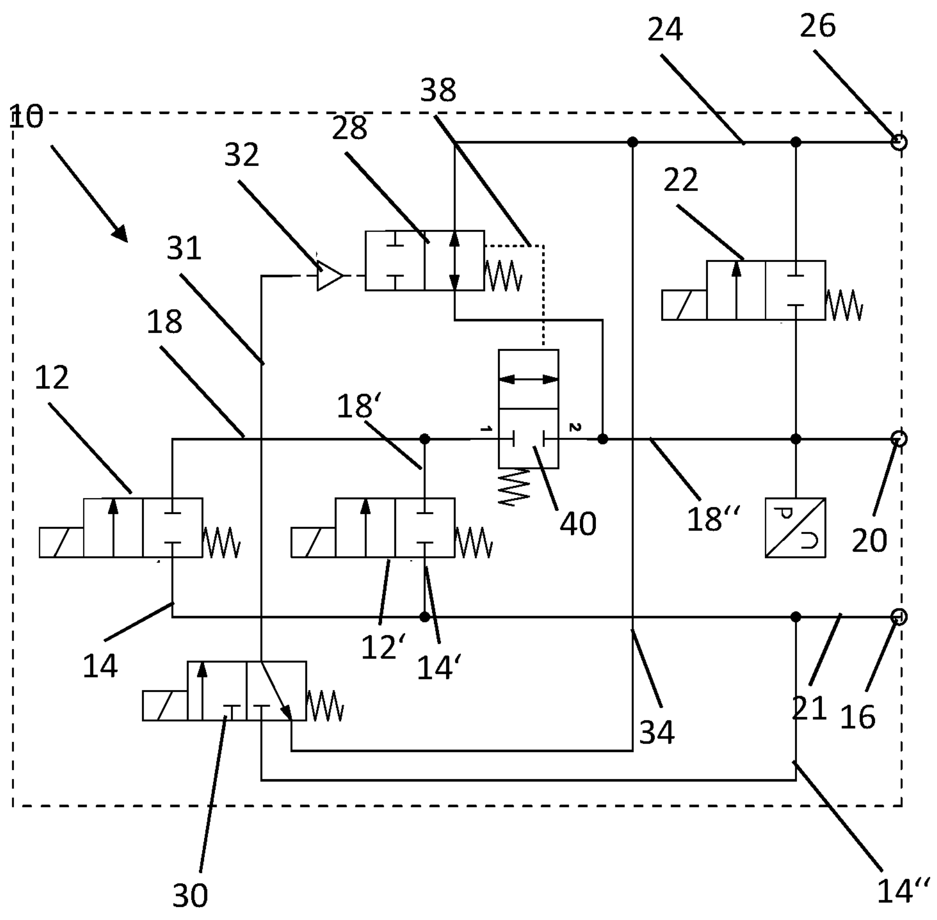
FIG. 3 shows a pneumatic circuit diagram of a controller according to a third preferred embodiment.
Figure 4:
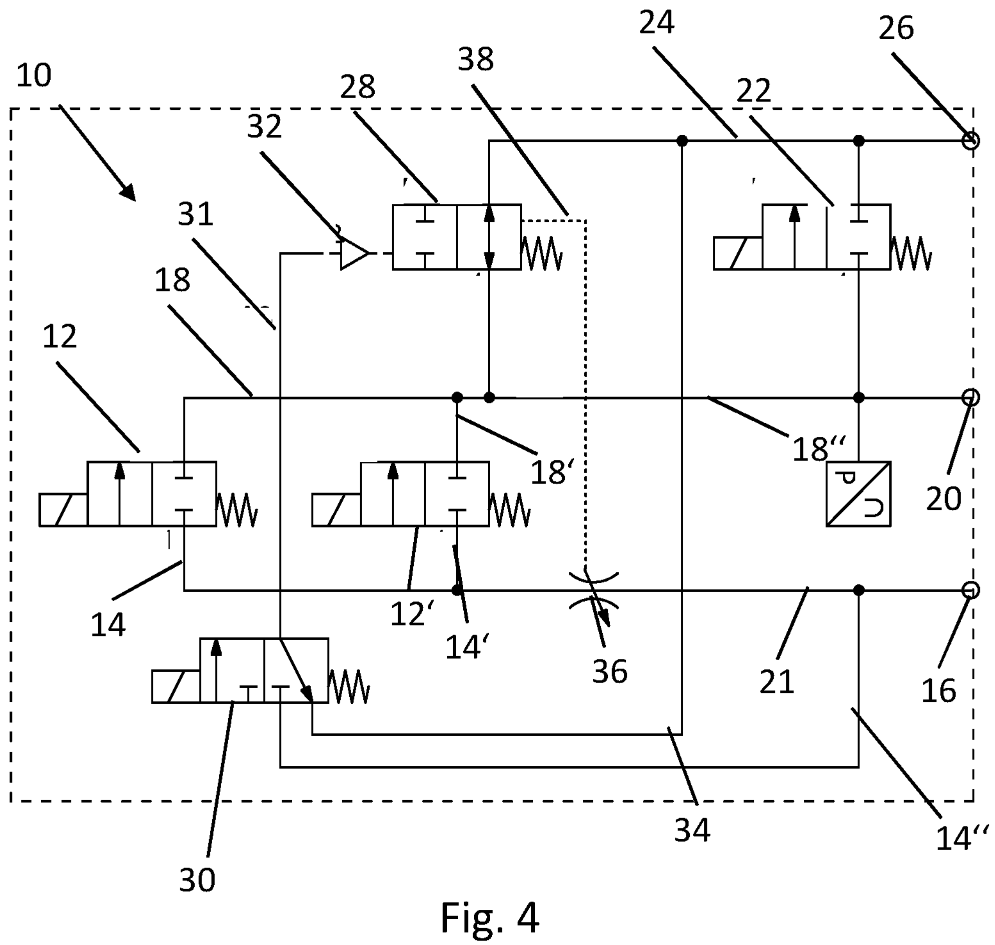
FIG. 4 shows a pneumatic circuit diagram of a controller according to a fourth preferred embodiment.

The controller 10 moreover has a controllable throttle 36 (see FIG. 3) or a mechanical pilot-controlled valve 40, in particular a poppet valve (see FIG. 4). The controllable throttle 36 or the valve 40 is arranged downstream from the node point of the working-pressure line 18" and upstream from the working-pressure port 20. The controllable throttle 36 or the mechanically pilot-controlled valve 40 is mechanically connected to the quick air bleed valve 28. Such a mechanical connection 38 is shown schematically by a dashed line.

Figure 2:
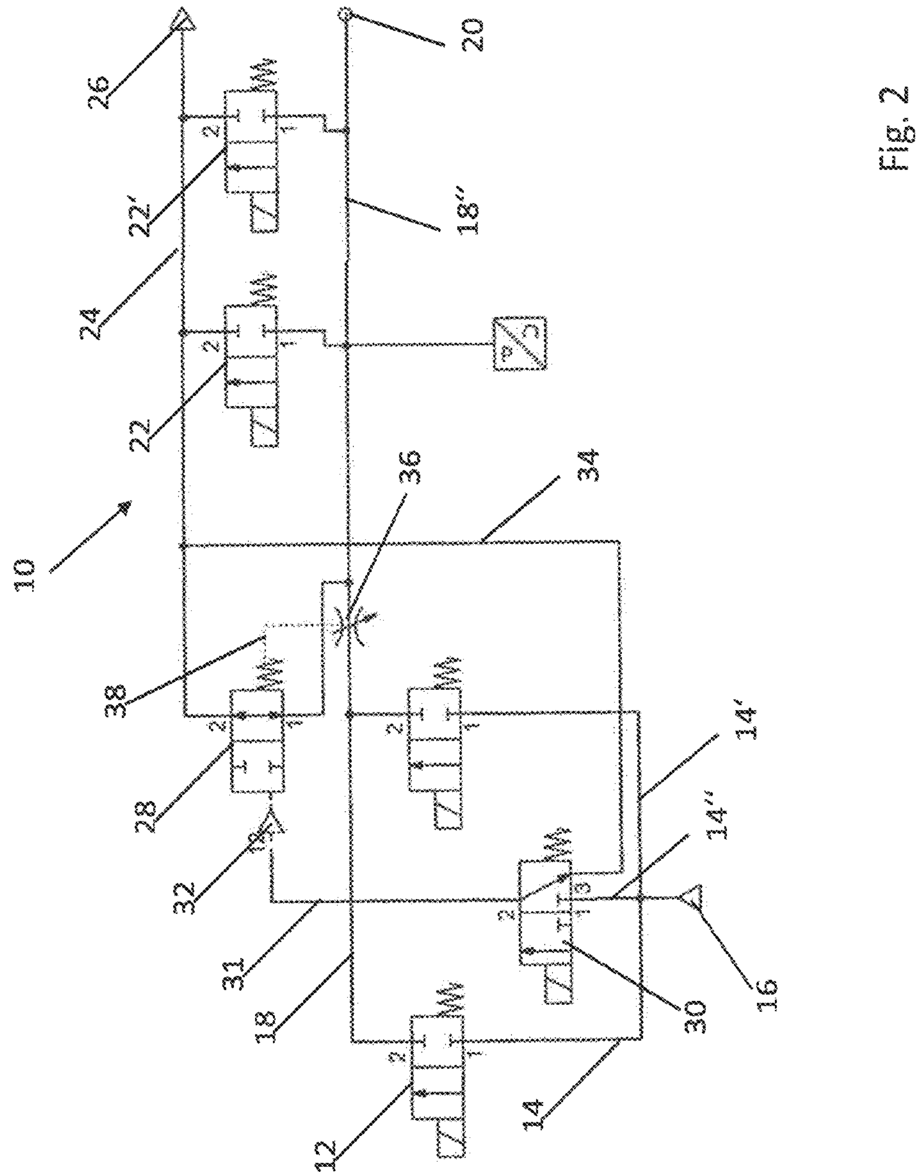
FIG. 2 shows a pneumatic circuit diagram of a controller according to a second preferred embodiment.

FIG. 2 differs from FIG. 1 only in that two outlet valves 22, 22' connected in parallel to one another are provided.

Figure 5:
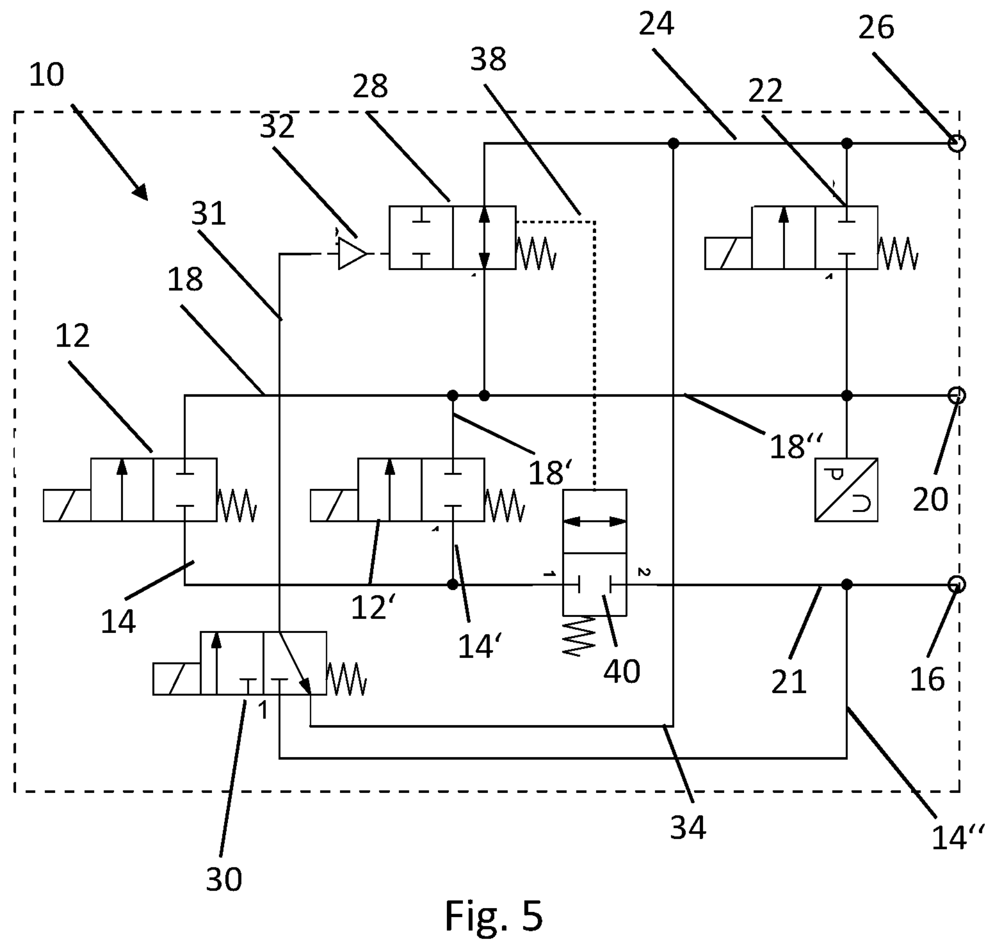
FIG. 5 shows a pneumatic circuit diagram of a controller according to a fifth preferred embodiment.

In the exemplary embodiments of FIGS. 3 to 5, the compressed-air source 16 can also be connected to the remainder of the pneumatic controlling device 10 via a pressure feed line 21 which is also referred to as an input line P. However, in contrast to FIGS. 1 and 2, this represents just a changed presentation and not a functional or technical change. By virtue of the pressure source 16 and the pressure feed line 21 which are illustrated differently from FIG. 1, the air feed line 14, 14', 14" also runs differently, although the way in which the differently presented components and arrangements work is otherwise the same from a pneumatic point of view.

In alternative exemplary embodiments, the controllable throttle (see FIG. 4) or the mechanically pilot-controlled valve (see FIG. 5) can also be arranged between the pressure source 16 and the at least one inlet valve 12, 12', in particular in the pressure feed line 21.

The invention claimed is:

1. A pneumatic controlling device for a hydrodynamic brake, with a working-pressure port, with at least one inlet valve via which a working-pressure line leading to the working-pressure port can be connected to an air feed line that is connected to a compressed-air source, and with at least one outlet valve via which the working-pressure line is connected to an air bleed line that is connected to an air bleed exit, wherein the working-pressure line is connected to the air bleed line via at least one quick air bleed valve, wherein a safety valve is arranged between the compressed-air source and the quick air bleed valve and is configured to actuate the quick air bleed valve.

2. The pneumatic controlling device as claimed in claim 1, wherein the safety valve is configured as a 3/2-way valve.

3. The pneumatic controlling device as claimed in claim 1, wherein a controllable throttle or a mechanically pilot-controlled valve is arranged between the at least one inlet valve and the working-pressure port.

4. The pneumatic controlling device as claimed in claim 1, wherein a controllable throttle or a mechanically pilot-controlled valve is arranged between the pressure source and the at least one inlet valve.

5. The pneumatic controlling device as claimed in claim 3, wherein the controllable throttle is mechanically connected to the at least one quick air bleed valve.

6. The pneumatic controlling device as claimed in claim 1, wherein the at least one quick air bleed valve is pneumatically pilot-controlled.

7. The pneumatic controlling device as claimed in claim 1, wherein the at least one quick air bleed valve has a nominal width in a range from 5 mm to 15 mm.

8. The pneumatic controlling device as claimed in claim 1, wherein in the pneumatic controlling device, the at least one inlet valve comprises at least two inlet valves, which are connected in parallel to one another.

9. The pneumatic controlling device as claimed in claim 1, wherein in the pneumatic controlling device, the at least one outlet valve comprises at least two outlet valves, which are connected in parallel to one another.

10. A hydrodynamic brake with a pneumatic controlling device as claimed in claim 1.

11. The hydrodynamic brake as claimed in claim 10, wherein the hydrodynamic brake comprises a retarder.

* * * * *